(12) United States Patent
Ushioda et al.

(10) Patent No.: US 8,298,091 B2
(45) Date of Patent: Oct. 30, 2012

(54) STEEL BALL ROLLING CONFIGURATION AND CONSTANT VELOCITY UNIVERSAL JOINT

(75) Inventors: Yoshimasa Ushioda, Iwata (JP); Hiroki Ooe, Iwata (JP); Kazuhiro Muramatsu, Iwata (JP)

(73) Assignee: NTN Corporation, Osaka (JP)

( * ) Notice: Subject to any disclaimer, the term of this patent is extended or adjusted under 35 U.S.C. 154(b) by 322 days.

(21) Appl. No.: 12/310,166

(22) PCT Filed: Aug. 20, 2007

(86) PCT No.: PCT/JP2007/066095
§ 371 (c)(1),
(2), (4) Date: Feb. 13, 2009

(87) PCT Pub. No.: WO2008/032532
PCT Pub. Date: Mar. 20, 2008

(65) Prior Publication Data
US 2009/0197688 A1 Aug. 6, 2009

(30) Foreign Application Priority Data

Sep. 11, 2006 (JP) .................................. 2006-245869

(51) Int. Cl.
*F16C 1/24* (2006.01)
(52) U.S. Cl. ........................................................ 464/15
(58) Field of Classification Search .................. 464/15, 464/906
See application file for complete search history.

(56) References Cited

U.S. PATENT DOCUMENTS

| 5,725,432 | A | * | 3/1998 | Konegen et al. | ............ 464/906 |
| 6,478,682 | B1 | | 11/2002 | Kura et al. | |
| 6,579,188 | B1 | | 6/2003 | Kura et al. | |
| 6,736,729 | B2 | * | 5/2004 | Wang et al. | .................... 464/15 |
| 2003/0130045 | A1 | | 7/2003 | Kura et al. | |
| 2004/0209693 | A1 | | 10/2004 | Kura et al. | |

FOREIGN PATENT DOCUMENTS

| JP | 61-167715 | 7/1986 |
| JP | 63-038718 | 2/1988 |
| JP | 2001-208091 | 8/2001 |

OTHER PUBLICATIONS

Universal Joint and Driveshaft Design Manual, AE-7, Warrendale, PA, Society of Automotive Engineers, Inc., pp. 145-150. TJ 1079.S62 1979.*
Machinery's Handbook, 25th ed., New York, International Press, 1996. pp. 706-709. TJ151.M3 1996.*
International Search Report mailed Nov. 27, 2007 for International Application No. PCT/JP2007/066095.
International Preliminary Report on Patentability and Written Opinion of the International Searching Authority mailed Mar. 26, 2009 for International Application No. PCT/JP2007/066095.

* cited by examiner

*Primary Examiner* — Gregory Binda
(74) *Attorney, Agent, or Firm* — Wenderoth, Lind & Ponack, L.L.P.

(57) ABSTRACT

A steel ball rolling configuration and a constant velocity universal joint have a superior oil retention effect between a surface of a steel ball and a partner rolling surface, and can form a thick oil film, improve lubrication, and extend life of the steel ball. The constant velocity universal joint includes a rolling surface and a steel ball that is lubricated by grease and rolls over the rolling surface. A surface roughness of the steel ball is roughened to become more similar to a surface roughness of a partner rolling surface. Numerous miniscule recesses roughly tens of micrometers in size are randomly disposed on the surface of the steel ball.

3 Claims, 4 Drawing Sheets

STEEL BALL ROLLING CONFIGURATION AND CONSTANT VELOCITY UNIVERSAL JOINT

TECHNICAL FIELD

The present invention relates to a steel ball rolling configuration and a constant velocity universal joint.

BACKGROUND ART

Conditions under which a constant velocity universal joint having a steel ball is used have become more diverse over recent years. The conditions are becoming more challenging in terms of, for example, increased temperature, increased load, and increased speed. Under such circumstances, temperature of the joint rises because of heat caused by sliding, temperature increase due to internal factors of bearings and joints, temperature increase due to external factors such as environment. In particular, in grease lubrication, the grease traps heat from the steel ball. Therefore, heat dissipation of the steel ball is lower compared to that of an inner joint component (inner ring) and an outer joint component (outer ring). As a result, the temperature of the steel ball increases significantly. The temperature increase in the steel ball becomes more significant particularly during high speed rotation. When the temperature increase in the steel ball is significant in this way, peeling of a surface layer of the steel ball occurs more easily compared to the inner and outer rings. Life of the constant velocity universal joint is shortened.

Therefore, conventionally, a joint is known in which surface roughness of the steel ball is made more similar to the surface roughness of a partner rolling surface (Patent Document 1). In other words, as a result of the surface roughness of the steel ball becoming more similar to the surface roughness of the partner rolling surface, lubrication between the steel ball and the inner and outer rings can be improved, and temperature increase of the steel ball can be suppressed. As a result, peeling of the surface layer can be prevented, and life of the steel ball can be extended.

Patent Document 1: Japanese Patent Laid-Open Publication No. Showa 61-167715

SUMMARY OF THE INVENTION

Problems to be Solved by the Invention

In a steel ball rolling configuration (such as a bearing) such as that described above, peeling life can be divided into an interior-originating type and a surface-originating type. The interior-originating type peeling occurs in an area with favorable lubrication conditions. As a result of the current improvements in cleanliness of the steel ball, the interior-originating type peeling rarely occurs, aside from when contact stress is large.

On the other hand, the surface-originating type peeling occurs in an area with insufficient lubrication conditions. The life is correlated with an oil film parameter (a ratio of oil film thickness of a contact area and composite surface roughness of two objects that are in contact) determined by elasto-hydrodynamic lubrication (EHL) theory.

To prevent surface-originating peeling, the oil film parameter is required to be increased. Therefore, improvements in lubricants and surface roughness of a bearing rolling surface have conventionally been made. However, based on the EHL theory, an assumption that the surface roughness of the contact surface is even is a prerequisite that may not be met by actual roughness.

Therefore, as described in Patent Document 1, merely making the surface roughness of the steel ball more similar to the surface roughness of the partner rolling surface is insufficient as a countermeasure against surface-originating peeling. Extended life cannot be achieved.

The present invention has been proposed in light of the above-described issues. An object of the present invention is to provide a steel ball rolling configuration and a constant velocity universal joint that achieves a superior oil retention effect between the surface of the steel ball and a partner rolling surface, can form a thick oil film, improve lubrication, and extend life of the steel ball.

Means for Solving the Problems

A steel ball rolling configuration of the present invention includes a rolling surface and a steel ball that is lubricated by grease and rolls over the rolling surface. A surface roughness of the steel ball is roughened to become more similar to a surface roughness of a partner rolling surface. Numerous miniscule recesses roughly tens of micrometers in size are randomly disposed on the surface of the steel ball.

In the steel ball rolling configuration of the present invention, numerous miniscule recesses roughly tens of micrometers in size are randomly disposed on the surface of the steel ball. As a result, lubricating fluid bypasses a contacting area (contacting area with a partner rolling surface) having a smooth surface. An amount of oil increases in the miniscule recesses, and the oil passes within a contact surface (steel ball surface). In other words, the miniscule recesses (micro oil pots) work an oil retention effect on the surface of the steel ball and the partner rolling surface. Moreover, the surface roughness of the steel ball is made more similar to the surface roughness of the partner rolling surface. As a result, an oil film layer between contact surfaces of the surface of the steel ball and the partner rolling surface can be formed with certainty.

A constant velocity universal joint of the present invention includes an outer joint component on which a track groove is formed on an inner diameter surface, an inner joint component on which a track groove is formed on an outer diameter surface, a plurality of balls interposed between the track groove on the outer joint component and the track groove on the inner joint component that transmit torque, and a cage interposed between the inner diameter surface of the outer joint component and the outer diameter surface of the inner joint component that holds the balls. A surface roughness of the balls is roughed to become more similar to a surface roughness of the track grooves on the outer joint component and the inner joint component. Numerous miniscule recesses roughly tens of micrometers in size are randomly disposed on the surface of the balls.

In the constant velocity universal joint of the present invention, numerous miniscule recesses roughly tens of micrometers in size are randomly disposed on the surface of the balls. As a result, lubricating fluid bypasses a contacting area (contacting area with the track grooves on the outer joint component and the inner joint component) having a smooth surface. An amount of oil increases in the miniscule recesses, and the oil passes within a contact surface (ball surface). In other words, the miniscule recesses (micro oil pots) work an oil retention effect on the surface of the balls and the surface of the track grooves. Moreover, the surface roughness of the balls is made more similar to the surface roughness of the track grooves on the outer joint component and the inner joint component. As a result, an oil film layer between contact surfaces of the surface of the balls and the partner rolling surface (track grooves on the outer joint component and the inner joint component) can be formed with certainty.

Advantage of the Invention

In the steel ball rolling configuration of the present invention, oil film formation capability is significantly improved by the combination of the surface roughness of the steel ball being roughened to become more similar to the surface roughness of the partner rolling surface, and the miniscule recesses (micro oil pots) working the oil retention effect. Therefore, temperature increase in the steel ball can be suppressed even under conditions of low viscosity and light lubrication, in which the oil film thickness is extremely thin. Extended life can be achieved.

In the constant velocity universal joint of the present invention, oil film formation capability is significantly improved by the combination of the surface roughness of the balls being roughened to become more similar to the surface roughness of the track grooves on the outer joint component and the inner joint component, and the miniscule recesses (micro oil pots) working the oil retention effect. Therefore, temperature increase in the balls can be suppressed and peeling of a surface layer of the balls can be prevented even under high temperatures, heavy load, and high speed. Extended life of the constant velocity universal joint can be achieved.

DETAILED DESCRIPTION OF THE INVENTION

Embodiments of the present invention will be hereinafter described with reference to FIG. 1 to FIG. 5.

Figure 1:
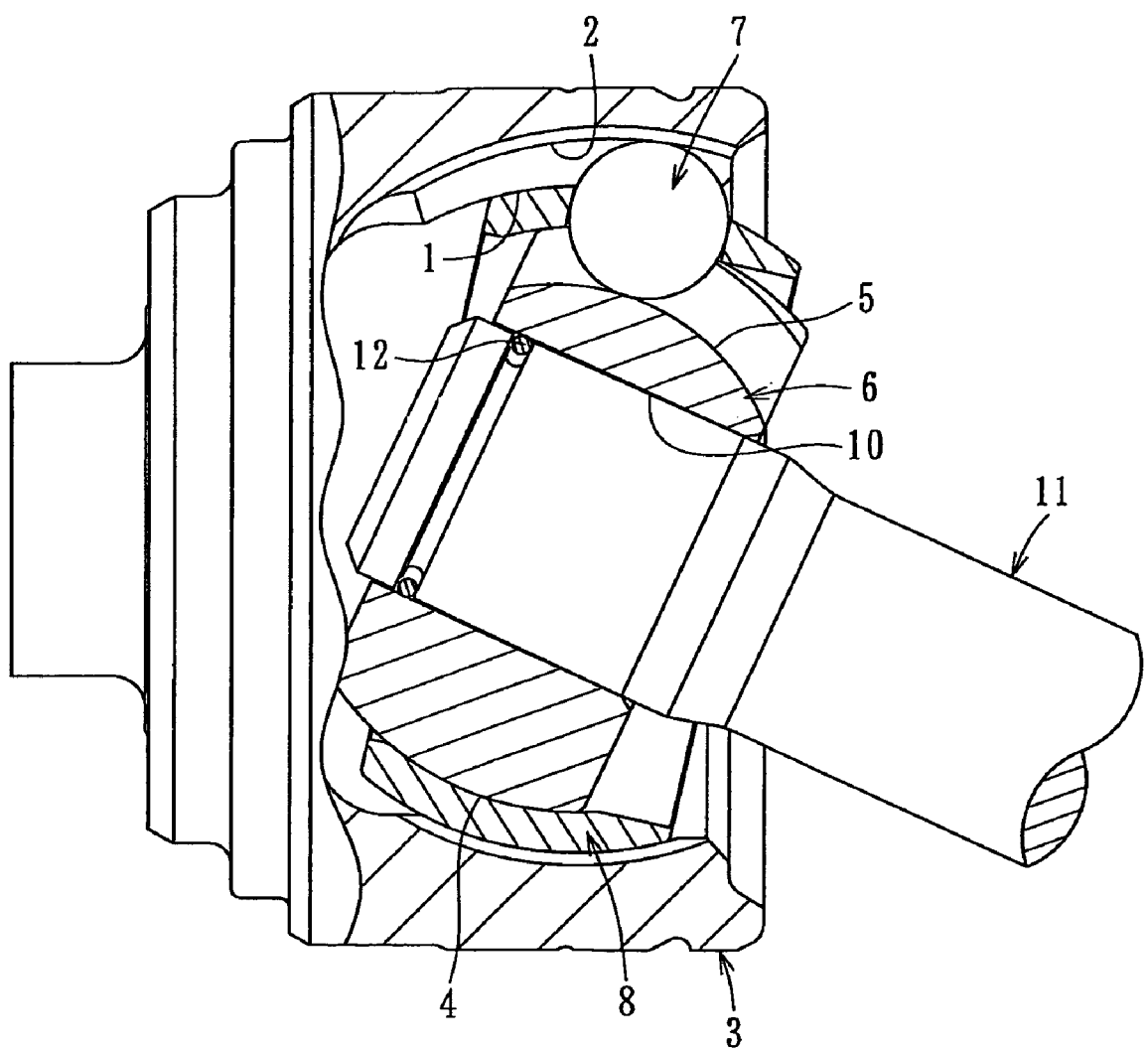
FIG. 1 is a cross-sectional view of a constant velocity universal joint using a steel ball rolling configuration according to an embodiment of the present invention.

FIG. 1 is shows a constant velocity universal joint using a steel ball rolling configuration of the present invention. The constant velocity universal joint includes an outer ring 3 that serves as an outer joint component, an inner ring 6 that serves as an inner joint component, a plurality of balls (steel balls) 7, and a cage 8. Track grooves 2 are formed on an inner diameter surface 1 of the outer ring 3. Track grooves 5 are formed on an outer diameter surface 4 of the inner ring 6. The balls 7, interposed between the track grooves 2 of the outer joint component and the track grooves 5 of the inner joint component, transmit torque. The cage 8, interposed between the inner diameter surface 1 of the outer joint component and the outer diameter surface 4 of the inner joint component, holds the balls 7. The balls 7 are lubricated by a lubricant, such as grease, enclosed between the inner ring 6 and the outer ring 3.

A shaft 11 is inserted into a center hole (bore hole) 10 of the inner ring 6 and engaged with a spline. As a result of spline engagement, torque can be transmitted between the shaft 11 and the inner ring 6. Detachment of the shaft 11 from the inner ring 6 is prevented by a stopper ring 12. A Birfield-type (BJ) constant velocity universal joint is shown. However, other types of constant velocity universal joints, such as an undercut-free (UJ) constant velocity universal joint, can also be used. In other words, all that is required is that a ball be used as a rolling element.

A surface roughness of the ball 7 is roughened to be more similar to a surface roughness of the track grooves on the inner ring 6 and the outer ring 3. In this case, a lower limit of the surface roughness of the ball 7 is set to be 0.1 μmRa<φ1<φ2 when the surface roughness of the ball 7 is φ1 and the surface roughness of the track grooves on the inner ring 6 and the outer ring 3 is 2φ. Conventionally, in this type of constant velocity universal joint, the surface roughness of the ball (steel ball) is 0.005 μmRa (0.2 μmRmax), and the surface roughness of the track grooves on the inner ring 6 and the outer ring 3 is 0.75 μmRa (3 μmRmax). Therefore, the surface roughness of the ball 7 is set to be about 0.75 μmRa (3 μmRmax). Here, Ra is a center line average height. Rmax is a maximum height. The center line average height is determined as follows. A roughness curve is turned back at a center line, and an area obtained from the roughness curve and the center line is divided by a measured length. The determined value is expressed in micrometers (μm). The maximum height is a height of a cross-sectional curve within the range of a reference length. The maximum height is expressed in micrometers (μm).

Ordinarily, a lubrication state is decided by the surface roughness σ1 and σ2 of both objects that are in contact, and an oil film thickness $h_0$. Therefore, the lubrication state can be adjusted by an oil film parameter Λ expressed by a following Expression 1. In this case, an ideal lubrication state can be achieved when the oil film parameter Λ is 3 or more.

$$\Lambda = h_0 / \sqrt{\sigma_1^2 + \sigma_2^2} \quad \text{[Expression 1]}$$

Figure 6:
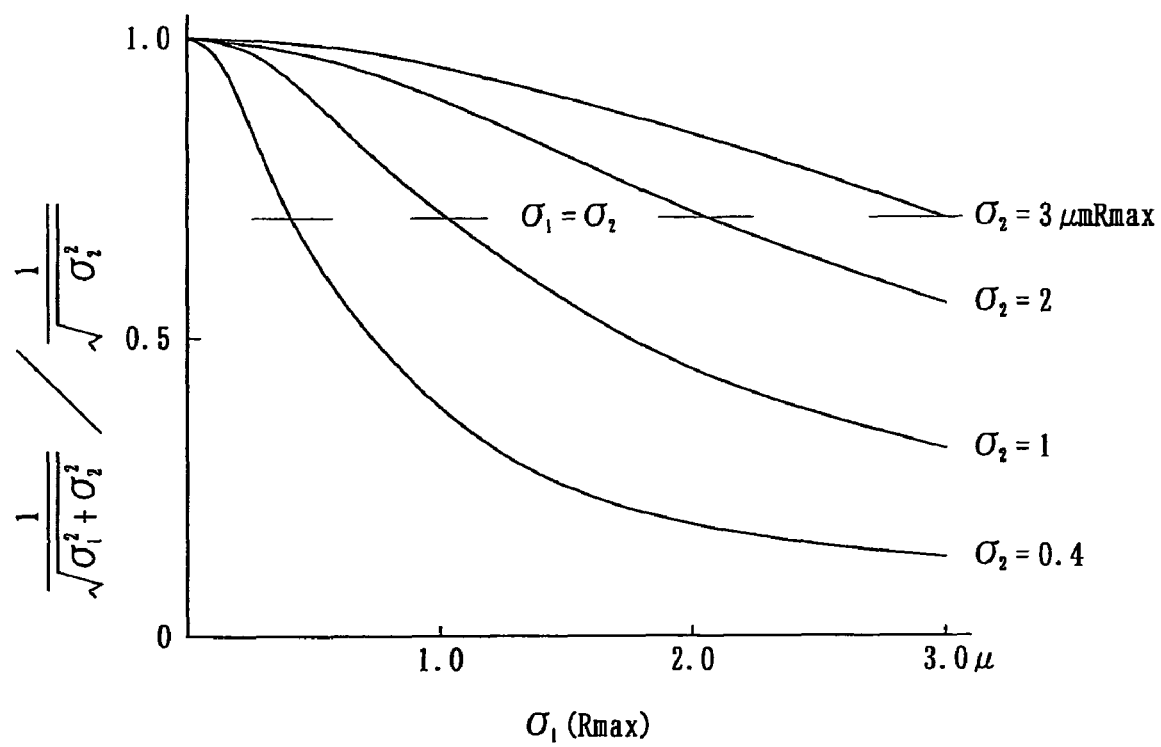
FIG. 6 is a graph showing changes in coefficients related to surface roughness of a steel ball and oil film parameter.

FIG. 6 shows, in a following Expression 2 within Expression 1, a change in Expression 2 caused by a change in σ1 when σ2 is constant. As is shown in FIG. 6, a decrease in the oil film parameter Λ can be expected as a result of an increase in σ1.

$$\frac{1}{\sqrt{\sigma_1^2 + \sigma_2^2}} \quad \text{[Expression 2]}$$

However, as a result of oil retention effect caused by the increase in lubricating oil due to increase in surface roughness, the oil film thickness $h_0$ increases. As a result, the oil film parameter Λ can be increased. In particular, when σ1 and σ2 are equal, the value of Expression 2 can be decreased, thereby increasing the oil film thickness $h_0$. As σ2 (surface roughness φ2 of the partner rolling surface) increases, the decrease in the value of Expression 2 lessens as a result of σ1 (surface roughness φ1 of the steel ball 7) being increased. Therefore, the oil film parameter Λ is significantly influenced by the lubricating oil retention effect caused by the increase in σ1. In other words, the greater the surface roughness of the partner rolling surface, the more the parameter Λ can be increased. In this way, making the surface roughness of the steel ball 7 more similar to the surface roughness of the partner rolling surface having a large surface roughness is preferable when improving lubrication.

Figure 2:
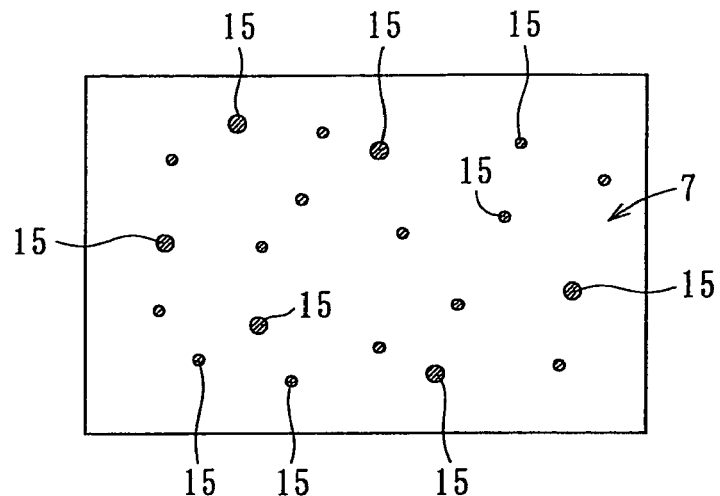
FIG. 2 is a simplified, microscopic observation view of a surface of a ball in the constant velocity universal joint.

In the present invention, numerous miniscule recesses (micro oil pots) 15 roughly tens of micrometers in size in their cross-sectional dimension are randomly formed on the surface of the ball 7, as shown in FIG. 2, while maintaining the surface roughness described above. In FIG. 2, the white-colored area excluding the miniscule recesses 15 is a smooth surface without directionality (isotropic). The surface roughness of this white-colored area is equivalent to the surface roughness of the track grooves on the inner ring 6 and the outer ring 3. The miniscule recesses 15 can be formed as miniscule dimples through selection of an optimal medium and grindstone. In this case, the miniscule recesses 15 of an arbitrary size and arbitrary number can be created by grinding conditions of the surface being changed. Depth of the miniscule recesses 15 is about 1 µm.

Figure 3:
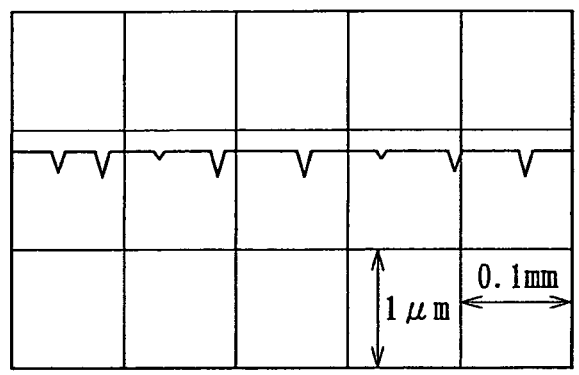
FIG. 3 is a simplified view of surface roughness of the ball in the constant velocity universal joint.

Next, FIG. 3 is a two-dimensional trace of the surface of the ball 7, indicating surface roughness. In this case, the miniscule recesses 15 appear as deep valleys.

Figure 5A:
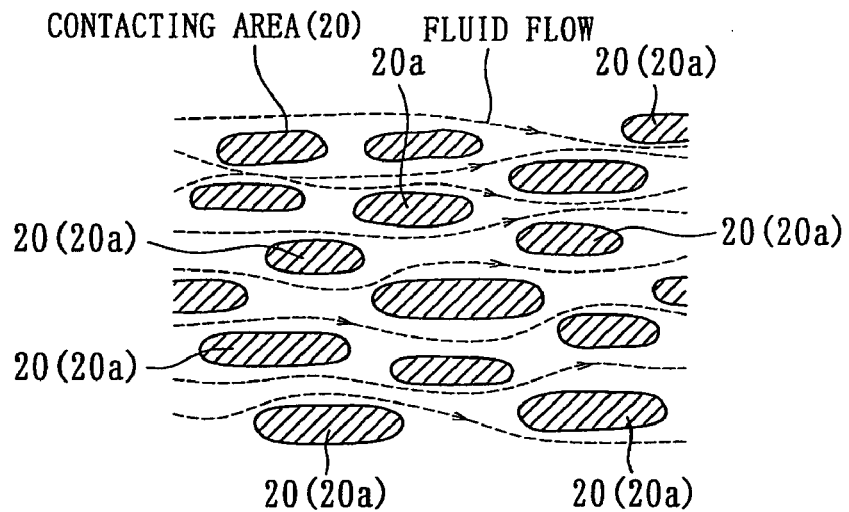
FIG. 5A to FIG. 5C are diagrams of fluid flow models.
Figure 5B:
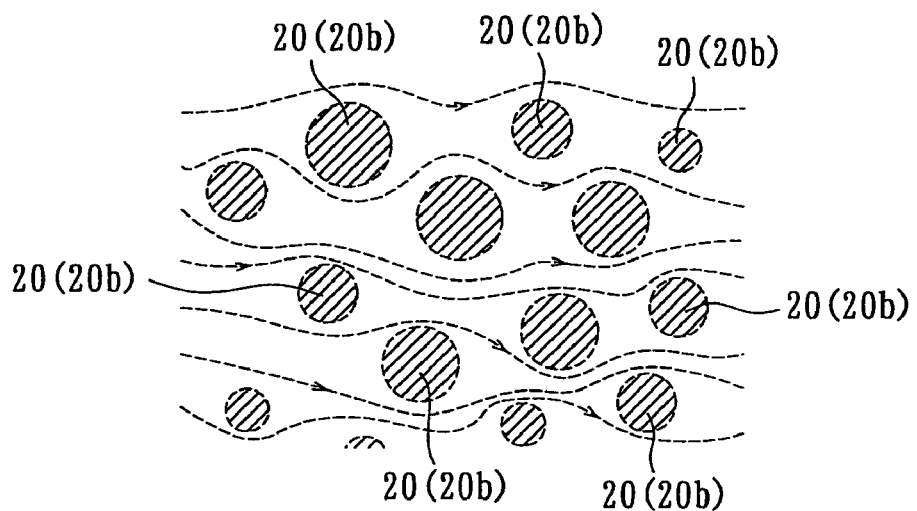
Figure 5C:
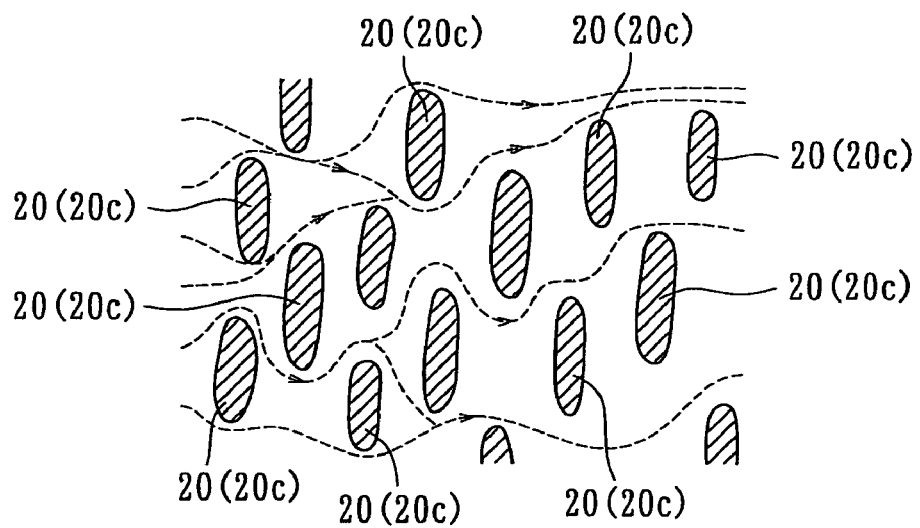

When models of lubricating fluid flow, such as those shown in FIG. 5A to FIG. 5C, are formed, resistance is greater in the lubricating fluid flows in FIG. 5B and FIG. 5C than in FIG. 5A and, therefore, an amount of fluid present within a contact area increases. As a result, the oil film thickness of a rolling contact surface increases. In FIG. 5A to FIG. 5C, hatched areas indicate contact areas 20a, 20b, and 20c formed by elastic deformation. Broken lines indicate the flow of lubricating fluid. In FIG. 5A and FIG. 5C, the contact areas 20a and 20c are elliptical to oval-shaped. In FIG. 5B, the contact areas 20b are circular. FIG. 5A shows when a rolling direction and a surface finishing process direction are the same. FIG. 5C shows when the rolling direction and the surface finishing process direction are perpendicular.

Figure 4:
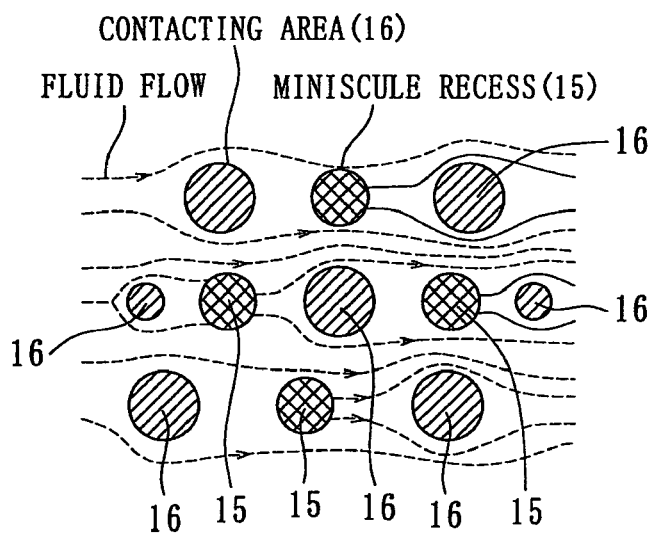
FIG. 4 is a diagram of a model of fluid flow in the steel ball rolling configuration of the present invention.

When the lubricating fluid flow model is applied to the constant velocity universal joint, the lubricating fluid flow can be indicated by a model such as that shown in FIG. 4. In FIG. 4, the hatched areas indicate elastic contacting areas 16. Cross-hatched areas indicate the miniscule recesses 15. The broken lines indicate the flow of lubricating fluid. In this case, the rolling direction is from left to right in FIG. 4. The lubricating fluid bypasses the contacting areas on the smooth surface. The amount of oil increases in the miniscule recesses 15, and the oil flows over the ball surface. As a result, the oil film can be formed.

In this way, as a result of the numerous miniscule recesses 15 that are roughly tens of micrometers in size being randomly formed on the surface of the steel balls (balls 7), the lubricating fluid bypasses the contacting areas (contacting areas with the track grooves on the outer ring 3 and the inner ring 6) on the smooth surface. The amount of oil increases in the miniscule recesses 15, and the oil passes over the ball surface. In other words, the miniscule recesses (micro oil pots) 15 work the oil retention effect on the surface of the balls 7 and the surface of the track grooves. Moreover, the surface roughness of the balls 7 is made more similar to the surface roughness of the track grooves on the outer ring 3 and the inner ring 6. As a result, the oil film layer between the contact surfaces of the surface of the balls 7 and the partner rolling surface (the track grooves 2 and 5 of the outer joint component and the inner joint component) can be formed with certainty. Therefore, oil film formation capability is significantly improved by the combination of the surface roughness of the balls 7 being roughened to become more similar to the surface roughness of the track grooves 2 and 5 of the outer joint component and the inner joint component, and the miniscule recesses 15 working the oil retention effect.

In this way, in the steel ball rolling configuration, the oil film forming capability is significantly improved. Therefore, the temperature increase in the steel balls can be suppressed even under conditions of low viscosity and light lubrication, in which the oil film thickness is extremely thin. Extended life can be achieved.

In the constant velocity universal joint using the steel ball rolling configuration, the temperature increase in the balls 7 can be suppressed and peeling of the surface layers of the balls 7 can be prevented even under high temperatures, heavy load, and high speed. Extended life of the constant velocity universal joint can be achieved.

The embodiment of the present invention is described above. However, the present invention is not limited thereto. Various modifications can be made. For example, in addition to the constant velocity universal joint, the steel ball rolling configuration can be a rolling bearing using a steel ball. The number of miniscule recesses 15 per unit area, the size of each miniscule recess 15, the depth of each miniscule recess 15, and the like can be arbitrarily changed within a range allowing the effect (micro oil pot effect) of preventing the oil film from becoming broken to be achieved by the oil being maintained in the miniscule recesses 15 through provision of the miniscule recesses 15, and allowing an improvement in oil film formation capability.

The invention claimed is:

1. A steel ball rolling configuration comprising:
   a rolling surface; and
   a steel ball that is lubricated by grease and rolls over the rolling surface, wherein
   a surface of the steel ball has numerous miniscule recesses roughly tens of micrometers in size randomly disposed therein, and
   a surface roughness of the surface of the steel ball, except for the numerous miniscule recesses, is similar to a surface roughness parameter of the rolling surface and larger than 0.4 µmRa.

2. A constant velocity universal joint comprising:
   an outer joint component having an inner diameter surface on which track grooves are formed;
   an inner joint component having an outer diameter surface on which track grooves are formed;
   a plurality of steel balls interposed between the track grooves on the outer joint component and the track grooves on the inner joint component that transmit torque; and
   a cage interposed between the inner diameter surface of the outer joint component and the outer diameter surface of the inner joint component that holds the steel balls, wherein
   a surface of each of the steel balls has numerous miniscule recesses roughly tens of micrometers in size randomly disposed therein, and
   a surface roughness of the surface of each the steel balls, except for the numerous miniscule recesses, is similar to a surface roughness parameter of the track grooves of the outer joint component and the track grooves of the inner joint component and larger than 0.4 µmRa.

3. A constant velocity universal joint comprising:
   an outer joint component having an inner diameter surface on which a track groove is formed;

an inner joint component having an outer diameter surface on which a track groove is formed;

a steel ball interposed between the track groove on the outer joint component and the track groove on the inner joint component that transmits torque; and a cage interposed between the inner diameter surface of the outer joint component and the outer diameter surface of the inner joint component that holds the steel ball, wherein a surface of the steel ball has numerous miniscule recesses roughly tens of micrometers in size randomly disposed therein, and a surface roughness of the surface of the steel ball, except for the numerous miniscule recesses, is similar to a surface roughness parameter of the track groove of the outer joint component and the track groove of the inner joint component and larger than 0.4 μmRa.

* * * * *